Dec. 8, 1959   H. M. HUENTELMAN   2,916,107
AUTOMATIC TRAILER BRAKE OPERATOR
Filed July 9, 1958

INVENTOR.
Howard M. Huentelman

United States Patent Office 2,916,107
Patented Dec. 8, 1959

2,916,107

AUTOMATIC TRAILER BRAKE OPERATOR

Howard M. Huentelman, Fairfield City, Ohio

Application July 9, 1958, Serial No. 748,108

4 Claims. (Cl. 188—112)

This invention relates to brakes for trailers and more particularly to operators therefor.

It is the object of the present invention to provide an automatic trailer brake operator for utility, house, horse, boat, highway and farm trailers which permits the owner to drive his car under normal car driving conditions and wherein there is no added load on the car brakes by the trailer when it is desired to stop.

It is another object of the present invention to provide an automatic trailer brake operator of the above type which makes it possible to change the trailer from one tow car to another without changing controls and which requires only a ball hitch on the car, no wires or special control valves being needed.

Figure 1:
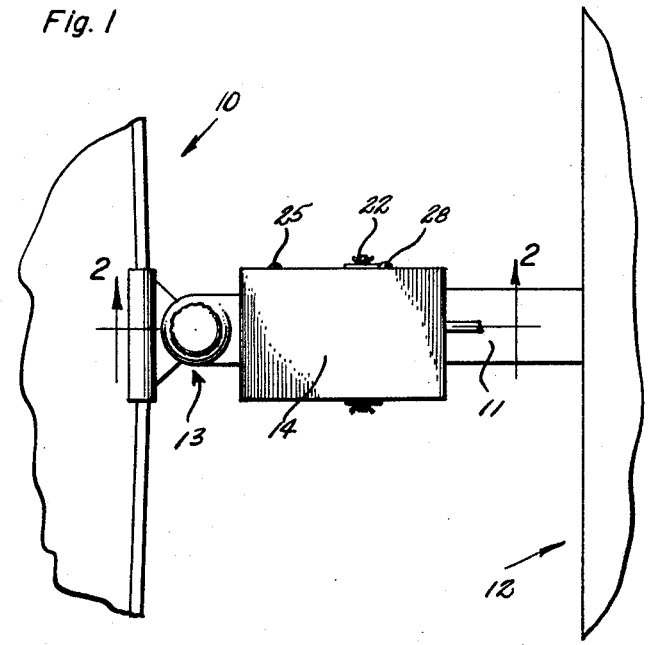
Figure 2:
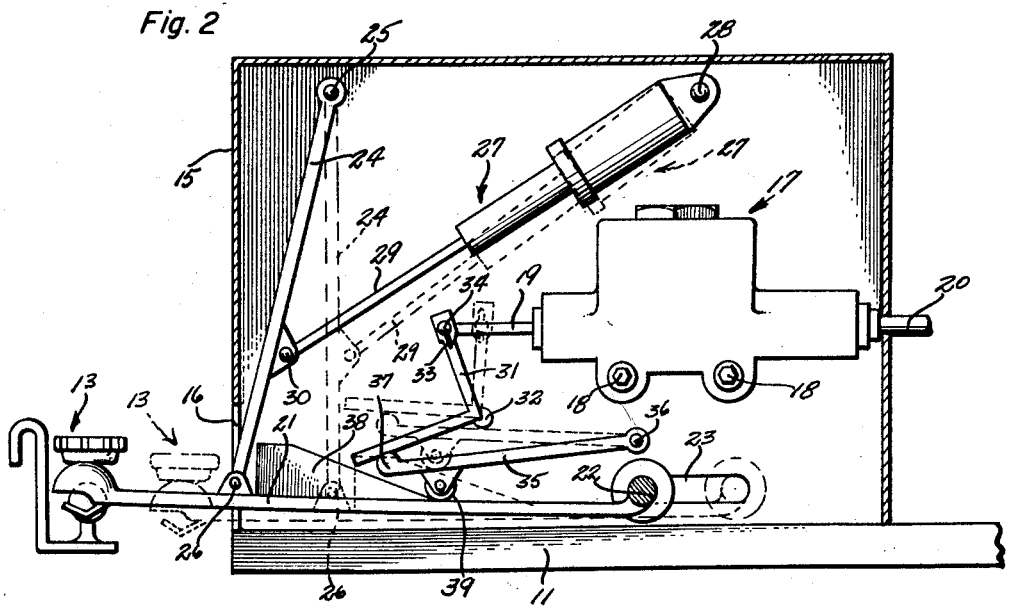

For other objects and for a better understanding of the invention, reference may be had to the following detailed description taken in connection with the accompanying drawing, in which:

Figure 1 is a top plan view of a preferred embodiment of the present invention shown in operative use; and Figure 2 is an enlarged vertical sectional view taken along the line 2—2 of Fig. 1.

Referring now more in detail to the drawing, 10 indicates generally a tow car to which the draw bar 11 or tow car bar of the trailer indicated generally at 12 is connected by means of the ball trailer hitch indicated generally at 13, substantially as illustrated.

In the practice of my invention, a rectangular housing 14 is suitably mounted on the end of the tow bar 11, and is provided in the front wall 15 thereof at the bottom with the opening 16.

A master brake cylinder indicated generally at 17 is suitably mounted within the housing 14 by means of the nut and bolt assemblies 18 and includes the usual actuating rod 19, extending forwardly thereof, the master cylinder 17 being connected to the brake drums of the trailer by means of the line 20.

The ball trailer hitch 13 includes the rearwardly extending rod 21 which passes through the opening 16 of the housing and is pivotally mounted at its rear end on the pin or shaft 22 which is adjustable longitudinally within the slots 23 provided in the opposite sides of the housing (Fig. 2).

A link 24 is pivotally mounted at its upper end on the pin 25, which is mounted in the side of the housing and is pivotally connected at its lower end to the rod 21 by means of pin 26.

An adjustable two way shock absorber indicated generally at 27 is pivotally mounted at its upper end on the side of the housing by means of the pin 28 and includes the rod 29 which is pivotally connected to the link 24 by means of the pin 30.

An L-shaped link 31 is pivotally mounted at its central portion about the pin 32, the upper end of the link 31 being pivotally connected to the actuating rod 19 by means of a vertically elongated slot 33, and the pin 34.

A link 35 is pivotally connected at its rear end to the housing by means of pin 36, and terminates at its lower end in the cam surface 37 which is adapted to raise and lower the link 31, upon upward movement of the link 35. In order to effect this upward movement, an inclined ramp 38 is fixedly carried by the rod 21 and supports the roller 39 which depends from the link 35. Thus, upon applying the brakes of the tow car 10, the ball trailer hitch 13 and rod 21 thereof will move rearwardly within the housing 14, as shown in phantom in Fig. 2. This rearward movement carries the ramp 38 rearwardly and thus raises the link 35 by means of the roller 39. This rotates the L-shaped link 31 in a clockwise direction which moves the actuating pin 19 inwardly within the master brake cylinder 17 to apply the brakes to the trailer.

It should now be apparent that there has been provided an automatic trailer brake operator for all types of trailers which will permit the owner to drive the car at normal car driving conditions and wherein the trailer provides no additional load on the car brake system when stopping. It should also be apparent that there has been provided an automatic trailer brake operator of the above type wherein there are no wires or special control valves needed and which makes it possible to change the trailer from one tow car to another without changing controls, all that is required being a ball hitch on the car.

While various changes may be made in the detail construction, it shall be understood that such changes shall be within the spirit and scope of the present invention as defined by the appended claims.

What I claim as new and desire to protect by Letters Patent of the United States is:

1. An automatic trailer brake operator comprising a housing mounted on the trailer tow bar and having an opening in the front thereof, a ball trailer hitch connecting the trailer tow bar to the tow car and including a rod extending rearwardly through said housing opening, the rear end of said rod being pivotally and slidably mounted within said housing, a master brake cylinder mounted within said housing above the rear end of said rod, said master brake cylinder including a forwardly extending actuating rod, a first link pivotally mounted at its rear end within said housing and intermediate the rear end of said rod and said master brake cylinder and extending forwardly therefrom, a second link pivotally mounted at its upper end within said housing and pivotally connected at its lower end to said rod inwardly of said housing opening, shock absorber means pivotally connected at one end within said housing and at its other to said second link, a depending roller at the forward end of said first link, a forwardly and upwardly extending ramp carried by said rod within said housing and adapted to raise said first link upon rearward movement of said rod and effect the application of the brakes of the tow car, and link means having one end pivotally connected to the forward end of said actuating rod and the other end in operative engagement with said first link whereby upon raising of said first link the trailer brakes would automatically be applied.

2. An automatic trailer brake operator according to claim 1, said last mentioned link means comprising an L-shaped link pivotally mounted at its central portion within said housing intermediate said actuating rod and said first link, a pin fixedly carried by the forward end of said actuating rod, the upper end of said L-shaped link having an elongated slot receiving said pin therewithin, said first link at the forward end thereof having a cam surface engaging the undersurface of said L-shaped link whereby to rotate the same in a clockwise direction upon rearward movement of said rod.

3. An automatic trailer brake operator according to claim 2, said shock absorber means comprising an adjustable two-way shock absorber.

4. An automatic trailer brake operator according to claim 3, said housing having a pair of elongated laterally aligned slots in the opposite sides thereof, a transverse shaft extending outwardly through said slots and fixedly mounting the rear end of said rod and means for preventing lateral displacement of said shaft through said slots.

References Cited in the file of this patent
UNITED STATES PATENTS

| | | |
|---|---|---|
| 2,189,335 | Ace et al. | Feb. 6, 1940 |
| 2,508,493 | Cook | May 23, 1950 |

FOREIGN PATENTS

| | | |
|---|---|---|
| 453,964 | Great Britain | Sept. 22, 1936 |